No. 767,305.   
PATENTED AUG. 9, 1904.
C. W. METCALF.
HONEY EXTRACTOR.
APPLICATION FILED NOV. 30, 1903.
NO MODEL.
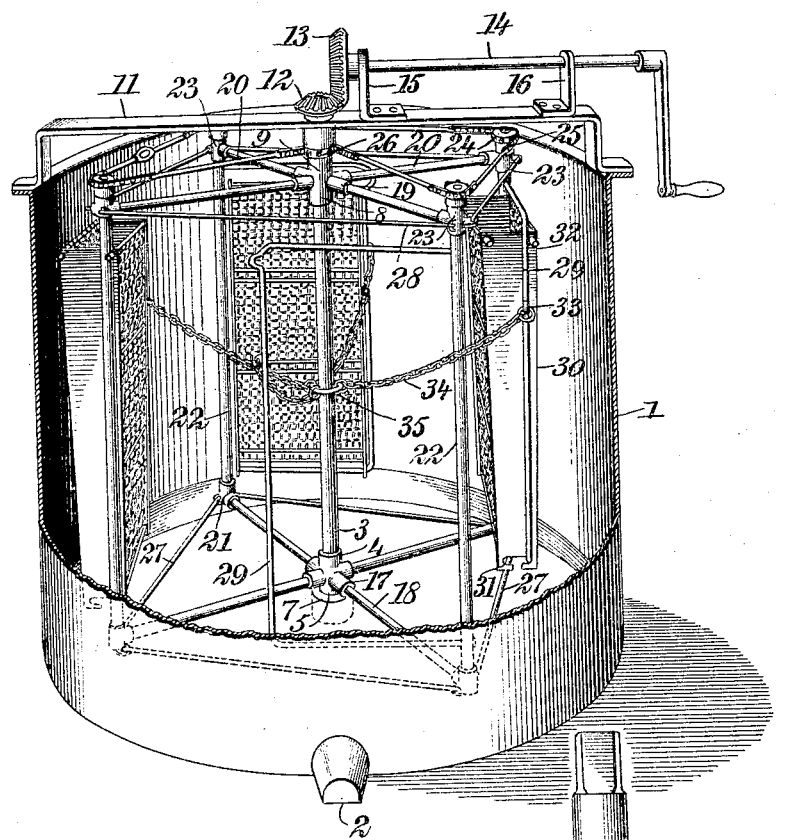
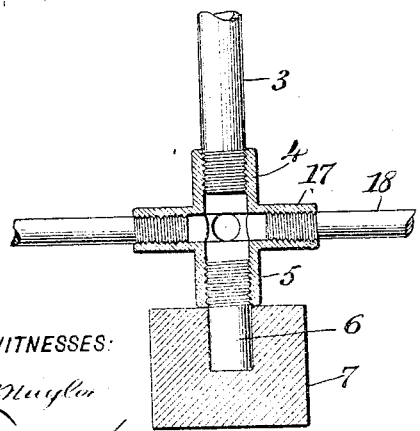
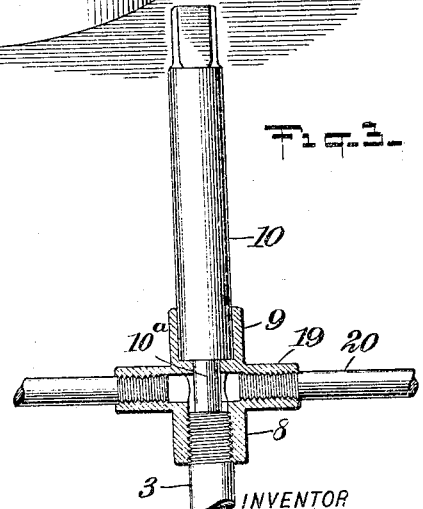
WITNESSES:
INVENTOR
Charles W. Metcalf
BY
ATTORNEYS No. 767,305.

Patented August 9, 1904.

UNITED STATES PATENT OFFICE.

CHARLES WESLEY METCALF, OF SAN DIEGO, CALIFORNIA.

HONEY-EXTRACTOR.

SPECIFICATION forming part of Letters Patent No. 767,305, dated August 9, 1904.

Application filed November 30, 1903. Serial No. 183,154. (No model.)

*To all whom it may concern:*

Be it known that I, CHARLES WESLEY METCALF, a citizen of the United States, and a resident of San Diego, in the county of San Diego and State of California, have invented a new and Improved Honey-Extractor, of which the following is a full, clear, and exact description.

This invention relates to improvements in machines for separating honey from the comb by centrifugal action, an object being to provide a machine for this purpose of simple construction and having a novel means for limiting the outward swing of the honey-carrying baskets.

I will describe a honey-extractor embodying my invention and then point out the novel features in the appended claims.

Reference is to be had to the accompanying drawings, forming a part of this specification, in which similar characters of reference indicate corresponding parts in all the figures.

Figure 1 is an elevation, partly in section, of a honey-extractor embodying my invention; and Figs. 2 and 3 are sectional details showing the manner of constructing the carrying-frame.

Referring to the drawings, 1 designates a tank having an outlet 2 for honey extracted from the comb. Arranged to rotate in the tank is a frame comprising a central vertical shaft 3, which is preferably made tubular and has its screw-threaded lower end engaged in a vertically-disposed portion 4 of the lower hub or socket member, and also connected to a vertically-disposed portion 5 of said socket member is an extension 6 for engaging in a step-bearing 7. (See Fig. 2.) The upper end of the shaft 3 has screw-thread engagement in the downwardly-extended socket member 8, and from an upwardly-extended member 9 of said socket member a short shaft 10 extends upward through a cross-bar 11, and removably mounted on this shaft 10 is a bevel-pinion 12, engaged by a bevel-gear 13 on an operating-shaft 14, having bearings in standards 15 16, attached to the cross-bar 11. The shaft 10 has a reduced extension 10ª, which extends into and has a bearing in the shaft 3.

Having screw-thread engagement with the horizontally-disposed socket members 17 of the lower hub are arms 18, and also extended outward from the horizontally-disposed members 19 of the upper hub are arms 20. The lower arms 18 have bearings 21 for receiving the lower ends of vertical shafts 22, said vertical shafts passing through bearings 23 at the ends of the arms 20, and on the upper ends of the shafts 22 are sprocket-pinions 24, engaged by a sprocket-chain 25, said sprocket-chain having a portion engaging with sprocket-teeth 26, secured to the short shaft 10. The several lower arms 18 are braced and connected one with another by tie-rods 27, and the upper arms 20 are braced by tie-rods 28.

Attached to the shafts 22 is a frame consisting of a bar 29, in which the honeycomb-baskets 30 are removably supported. The baskets 30 have perforated opposite sides and are open at the top, so that the honeycomb may be readily placed therein. The side portions of the baskets are provided with slots 31 for receiving the lower bars of the frames 29, the said slots 31 having outward openings, and at the upper end the side portions of the baskets are provided with pins 32, the pins at one side being designed to engage with vertically-disposed portions of the basket-carrying frames, while the pins at the opposite side are designed to engage with the shafts 22, thus holding the baskets in a substantially vertical position as the carrying-frame is rotated.

From eyes 33 on the vertical portions of the frames 29 chains 34 extend to connection with a ring 35, surrounding the shaft 3 and movable vertically thereon. These chains will limit the outward movement of the baskets, but will prevent the reversing of the same, as will be hereinafter described.

In the operation the combs containing the honey are placed in the baskets and then by rotating the frame through the medium of the shaft 14 the honey at the outer side of the baskets will be thrown outward by centrifugal action and passed down to the bottom of the tank and out through the spout or outlet 2. After extracting the honey from one side the rotation of the shaft 14 is to be quickly reversed, consequently reversing the rotation of the carrying-frames, through the medium of the sprocket-chain. When thus reversed, the baskets will swing inward and then outward, presenting the other side in a position for extracting the honey. During this swinging movement of the baskets the ring 35 will move downward on the shaft 3, and when the baskets swing outward the ring will move upward. By employing the socket members the several parts of the carrying-frame may be quickly assembled and at a comparatively small cost.

Having thus described my invention, I claim as new and desire to secure by Letters Patent—

1. A honey-extractor comprising a tank, a frame mounted to rotate in said tank and comprising upper and lower socket members, a shaft engaging with the vertically-disposed members of said socket-members, arms extended outward from the horizontally-disposed parts of said socket members, shafts having bearings in the outer ends of said arms, baskets carried by said shafts, and flexible devices having connection with the baskets and sliding connection with the first-named shaft.

2. A honey-extractor comprising a tank, a vertical shaft therein, arms extended outward from said shaft at the upper and lower ends, shafts having bearings in the outer ends of said arms, sprocket-pinions on the upper ends of said shafts, sprocket-teeth on the first-named shaft, a sprocket-chain engaging with said teeth and with the sprocket-pinions, basket-carrying frames on the last-named shafts, and flexible connections between said frames and the first-named shaft.

3. A honey-extractor comprising a tank, a frame mounted to rotate in the tank, shafts having rotary connection with the frame, basket-carrying frames arranged on said shafts, a main shaft arranged in the frame, a ring movable on said main shaft, and chains connecting said ring with the basket-carrying frames.

In testimony whereof I have signed my name to this specification in the presence of two subscribing witnesses.

CHARLES WESLEY METCALF.

Witnesses:
W. J. MOSSHOLDER,
DELIA A. SEVERIN.